June 13, 1933. W. OTTO 1,914,283
CONTROL OF THE BRAKES AND THE THROTTLES OF AUTOMOBILES
Filed Dec. 14, 1931
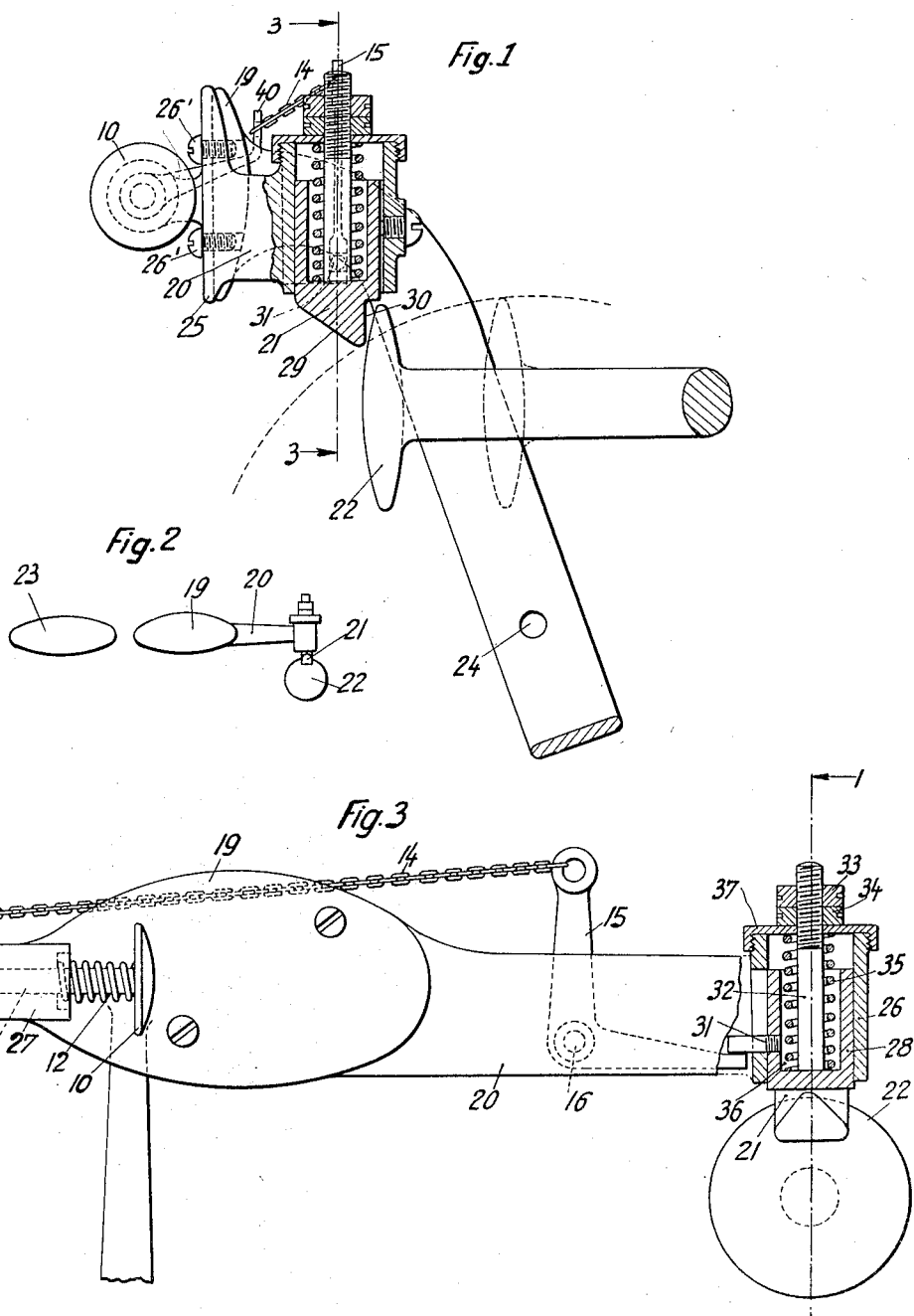
Wolfgang Otto
Inventor.
Attorney.

Patented June 13, 1933

1,914,283

UNITED STATES PATENT OFFICE

WOLFGANG OTTO, OF KITZEBERG NEAR KIEL, GERMANY

CONTROL OF THE BRAKES AND THE THROTTLES OF AUTOMOBILES

Application filed December 14, 1931, Serial No. 581,004, and in Germany December 22, 1930.

My invention relates to the control of the brakes and the throttle of automobiles and has for its object a simplified construction and arrangement of the control pedals which will facilitate the operation of the vehicle and preclude a faulty operation which is particularly liable to occur when the driver is inexperienced.

In the standard construction of modern automobiles the clutch, the brakes and the throttle are operated from separate pedals arranged one beside the other from the left to the right in the order named. While driving the vehicle the driver usually holds his right foot on the gas pedal which controls the throttle and his left foot on the floor boards in readiness to step down on the clutch pedal if it should become necessary to stop the vehicle. In this case the driver will lift his right foot from the gas pedal and shift it over to the adjacent brake pedal to depress the same, with or without stepping down on the clutch pedal with his left foot at the same time.

This arrangement of the pedals involves the danger for inexperienced drivers that, anxious to step on a pedal with their right foot to immediately stop the vehicle, they inadvertently fail to first shift their right foot to the left and, therefore, do not step on the brake pedal but on the gas pedal whereby the vehicle would be accelerated instead of slowed down.

It has been suggested prior to my invention to provide a remedy by so connecting the brake pedal with the gas pedal that the latter need not be directly operated but may be actuated by an initial depression of the brake lever just before the brakes are applied, (U. S. patent to Sabbag No. 1,472.993 and the French patent to Anzani No. 456,661). The particular constructions which had been proposed involved the disadvantage that during the release of the brake lever after application of the brakes the throttle was fully opened again and was not closed until the brake lever had fully returned to its normal position. In a certain other construction suggested prior to my invention a skillful operation of the brake pedal was required for breaking the operative connection between the same and the gas pedal when it was desired to shut off the gas and to apply the brakes, compare the American patent to McKlean No. 1,664,479.

Therefore, one of the objects of my invention resides in an operative connection of the brake pedal with the gas pedal which is free from these objections, and will automatically shut off the gas when the brakes are applied. Another object of my invention is a simple contrivance in form of an attachment which may be applied to existing automobiles of standard construction for the aforesaid purpose. I attain these and other objects which will appear from the description of my invention following hereinafter by providing the brake pedal with means which, during the initial depression thereof, open the throttle, preferably through the gas pedal, but release the same automatically owing to the mode of their operation when the brake pedal passes through a certain position.

The gas pedal will not be re-engaged until the brake pedal has returned to its initial position. Therefore, the gas pedal cannot be operated again upon an application of the brakes until the brake pedal has fully returned.

When driving in traffic the driver frequently desires to slowly step down the brake pedal just to the point where the brakes begin to operate without giving gas at the same time. Another object of my invention is an arrangement permitting of such operation. For this purpose I provide special means for disabling the operative connection of the brake pedal with the gas pedal which means may be operated by the driver at any time. Preferably these means may be in form of a sliding member mounted on the brake pedal to be operable by a sidewise movement of the driver's foot and adapted to withdraw a tripping pawl from engagement with the gas pedal.

A preferred embodiment of my invention is illustrated in the accompanying drawing.

Fig. 1 is a side view partly in section along the lines 1—1 of Fig. 3,

Fig. 2 illustrates the arrangement of the three control pedals in a diagrammatic fashion, and Fig. 3 is an elevation viewed from the left of Fig. 1, partly in section along the lines 3—3 of Fig. 1.

The clutch pedal 23, the brake pedal 19 and the gas pedal 22 are arranged one beside the other in the customary manner shown in Fig. 2.

While the pedals 19 and 23 are ordinarily mounted to be swingable about the same shaft diagrammatically indicated at 24 in Fig. 1 and, therefore, move along parallel paths, the generally adopted standard arrangement is such that the gas pedal moves along some other path. In the drawing my invention is shown as applied to a car in which the gas pedal is mounted to move horizontally from the normal position shown in full lines in Fig. 1 to the operated position indicated by dotted lines. It will be easily appreciated, however, that my invention is just as well applicable to any other construction in which the gas pedal moves along a path which is not parallel to that of the brake pedal.

For the purposes of my invention I have firmly attached a plate 25 to the brake pedal 19 by means of screws 26' which plate is integral with a laterally extending arm 20 terminating into a vertical sleeve shaped portion 26 overlying the gas pedal 22. Moreover, the plate 25 is formed with a lug 27 positioned at the opposite side and having a horizontal boring, the purpose of which will be described later.

The cylindrical sleeve 26 slidingly accommodates a piston shaped member 28 integral with a downward projection 21 constituting a tripping pawl. The tripping pawl has an inclined rear face 29 and a vertical front face 30 as will appear from Fig. 1. Suitable means are provided for preventing a relative turn of the piston member 28 within the cylindrical sleeve 26 such as a pin 31 screwed into member 28 and guided in a vertical slot of the sleeve 26.

The piston 28 is equipped with a vertical stem 32 having a threaded upper end adapted to receive a nut 33 and a counter nut 34. A helical spring 35 surrounds stem 32 and bears against the bottom of a recess 36 of the piston and against a suitable cover plate 37 screwed on the sleeve 26 and provided with a central boring through which the threaded end of the stem 32 projects. Thus, the spring 35 tends to keep the piston member 28 in its lower position in which the counter nut 34 bears against the cover 37.

The lug 27 slidingly accommodates a stem 38 carrying on its right hand end an integral foot plate 10 and on its left hand end a collar 39 having a forwardly and upwardly extending ear 40. A spring 12 is inserted between the plate 10 and the lug 27 and tends to keep the parts in the position shown in Fig. 3 in which the collar 39 bears against the lug 27. A bellcrank 15 is mounted on a horizontal pivot pin 16 suitably screwed into the front face of arm 20. The horizontal arm of the bellcrank 15 engages beneath the projecting end of the pin 31 and the vertical arm of the bellcrank is connected with the ear 40 by means of a chain 14.

The operation is as follows:

In Fig. 1 the brake pedal is shown in its normal or initial position. When the driver steps on the brake pedal, the brakes will not be applied until the pedal has moved a certain distance. In the course of this movement the tripping pawl 21 engages the gas pedal 22 and carries the same along towards the right with reference to Fig. 1, whereby the throttle is opened. The brakes will not be applied until the gas pedal reaches the position indicated by dotted lines in Fig. 1 and has thus fully opened the throttle. If it is desired to apply the brakes the driver steps the brake pedal further down so that the tripping pawl 21 moving along the circle shown in dotted lines in Fig. 1, disengages the gas pedal and permits the same to return to its initial position under the action of the customary spring (not shown).

When the driver releases the brake pedal the latter returns to normal position and the inclined face 29 of the tripping pawl engages the brake pedal 22 during this return movement and the pawl will freely ride over the gas pedal until it snaps down in front of the same to resume the position shown in Fig. 1.

In order to enable the driver to operate the brakes without opening the throttle as may be desirable for instance when driving through traffic or driving while the engine is still chilly, I have provided means enabling the driver at any time to disable the operative connection of the brake pedal with the gas pedal. For this purpose I have arranged the slide plate 10 with its associated parts. When the driver moves his foot resting on the brake pedal 19 towards the left and thus displaces the plate 10, the bellcrank 15 will be rocked and will engage the pin 31 and thus lift the tripping pawl 21 against the action of the spring 35. When the operator thus holding his foot against the plate 10 depresses the brake pedal, the tripping pawl 21 will freely pass above the gas pedal 22 without operating the same. In this case the pedal 19 acts on the brakes only and not on the throttle.

From the foregoing description it will be apparent that the tripping pawl while adapted to operate the gas pedal on the depression of the brake lever will not act on the gas lever during its return to normal. Obviously any equivalent means may be substituted for the tripping pawl which are adapted to operates the throttle coincidentally with the initial depression of the brake lever without, however, opening the throttle during the return of the brake lever.

What I claim is:—

1. In the controlling arrangement for an automobile the combination comprising a brake pedal adapted to cause a brake application after an initial idle movement, a gas pedal arranged adjacent to said brake pedal and means carried by said brake pedal and adapted to engage the same on depression thereof during said initial movement and to disengage said gas pedal upon completion of said initial movement, and to return to its initial position together with said brake pedal upon release of the same without actuating said gas pedal.

2. In an automobile having a gas pedal and a brake pedal, the combination with the latter of a tripping pawl mounted on said brake pedal for relative movement thereto and overlying said gas pedal and adapted to operate the same upon initial depression of said brake pedal and to clear the gas pedal after said initial depression and to freely ride over said gas pedal when returning to normal position.

3. In an automobile the combination comprising a pivotal brake pedal, a member carried thereby and adapted to move in unison with the same along an arcuate path, a gas pedal adapted to move along a path intersecting said arcuate path, said member overlying said gas pedal in normal position and being adapted to actuate said gas pedal on an initial depression of said brake pedal and to slip off from said gas pedal on continued depression of said brake pedal.

4. Controlling means for an automobile comprising a brake pedal, a throttle-controlling lever arranged adjacent thereto, an arm carried by said brake pedal and extending towards said lever, a tripping pawl carried by said arm and adapted to engage said lever and to actuate the same on initial movement of said brake pedal and to slip off from the same after said initial movement and a spring tending to hold said tripping pawl in active position relative to said lever.

5. An attachment for the brake pedal of an automobile comprising an arm terminating into a sleeve shaped portion, a piston shaped member guided in said portion and integral with a tripping pawl, a cover on said sleeve shaped portion and a spring enclosed between said cover and said piston shaped member.

6. In the controlling arrangement for an automobile the combination comprising a brake lever, a throttle-controlling member, an operative connection between both adapted to actuate said throttle-controlling member upon a depression of said brake pedal and means adapted to disable said connecting means and to be operated at will by the driver.

7. In the controlling arrangement for an automobile the combination comprising a brake pedal, a gas pedal, means carried by the former to actuate the latter on an initial depression thereof and means movably mounted on said brake pedal to be operable by the driver and adapted to disable said first mentioned means, whereby the gas pedal may be actuated or not actuated, as desired, during an initial depression of the brake pedal by means of a single manipulation of the latter.

8. In an automobile the combination comprising a brake lever, a throttle-controlling member, a tripping pawl carried by said brake lever and adapted to actuate and to release said throttle-controlling member during a single depression of said brake lever, and a sliding member mounted on said brake lever to be operable by the foot resting on the latter, said sliding member being operatively connected to said tripping pawl and adapted to shift the same to inactive position, whereby the throttle controlling member may be actuated or not actuated, as desired, during an initial depression of the brake lever by means of a single manipulation of the latter.

9. An attachment for the controlling arrangement of an automobile comprising a plate adapted to be attached to the brake pedal, an arm integral with said plate, a tripping pawl mounted on the end of said arm, a sliding member mounted on said plate for parallel movement therewith and connecting means provided between said sliding member and said tripping pawl, whereby the latter may be moved to inactive position by actuation of said sliding member.

In testimony whereof I affix my signature.

WOLFGANG OTTO.